(No Model.) 2 Sheets—Sheet 1.

R. RICE.
CAR BRAKE.

No. 581,429. Patented Apr. 27, 1897.

Witnesses:
P. M. Hulbert
O. F. Barthet

Inventor:
Robert Rice
By Attys.

(No Model.) 2 Sheets—Sheet 2.

R. RICE.
CAR BRAKE.

No. 581,429. Patented Apr. 27, 1897.

Witnesses:
P. M. Hulbert
O. F. Barthel

Inventor:
Robert Rice
By Thos. H. Sprague & Co.
Attys.

UNITED STATES PATENT OFFICE.

ROBERT RICE, OF DETROIT, MICHIGAN, ASSIGNOR OF THREE-FOURTHS TO GEORGE STROH AND JAMES RICE, OF SAME PLACE.

CAR-BRAKE.

SPECIFICATION forming part of Letters Patent No. 581,429, dated April 27, 1897.

Application filed September 26, 1896. Serial No. 607,028. (No model.)

*To all whom it may concern:*

Be it known that I, ROBERT RICE, a citizen of the United States, residing at Detroit, in the county of Wayne and State of Michigan, have invented certain new and useful Improvements in Car-Brakes, of which the following is a specification, reference being had therein to the accompanying drawings.

It is the object of my invention to provide a brake for cars or other track-vehicles which will not injure the wheels, requires but a small expenditure of power to apply it, and produces a powerful braking effect.

The invention consists of a main braking device independent of the supporting-wheels of the truck in combination with a second brake on one of the truck-axles, which is under the control of the brakeman and is connected with the main brake, furnishing the power required for operating the same.

The invention further consists in the peculiar construction, arrangement, and combination of parts, as more fully hereinafter described.

Figure 1:
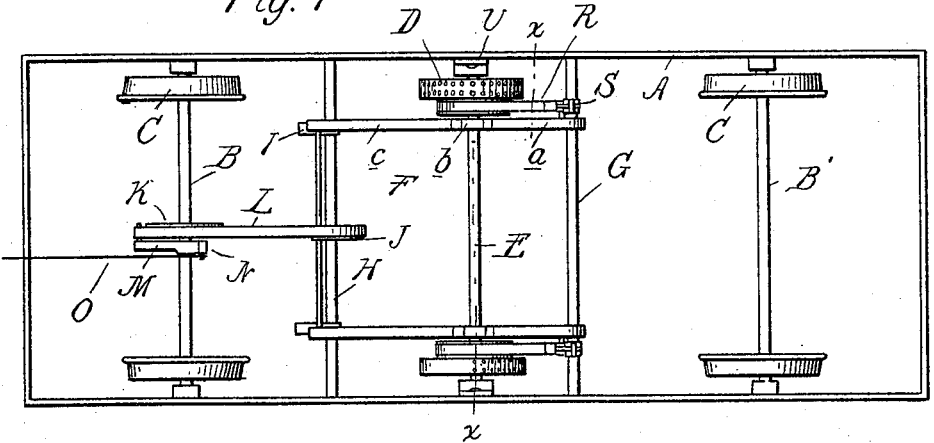
Figure 2:
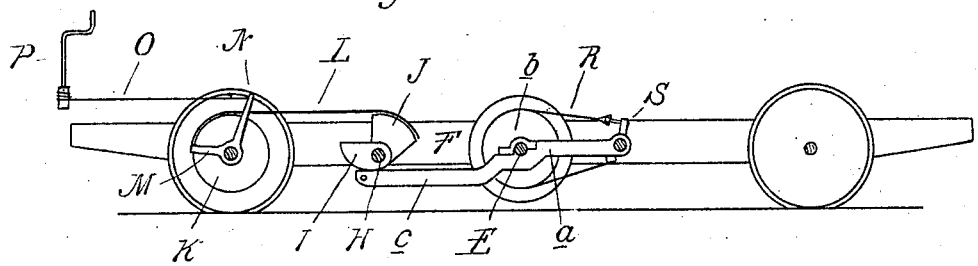
Figure 6:
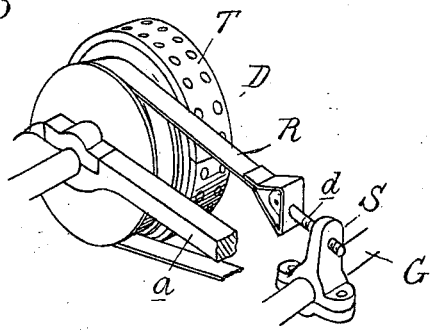
Figure 3:
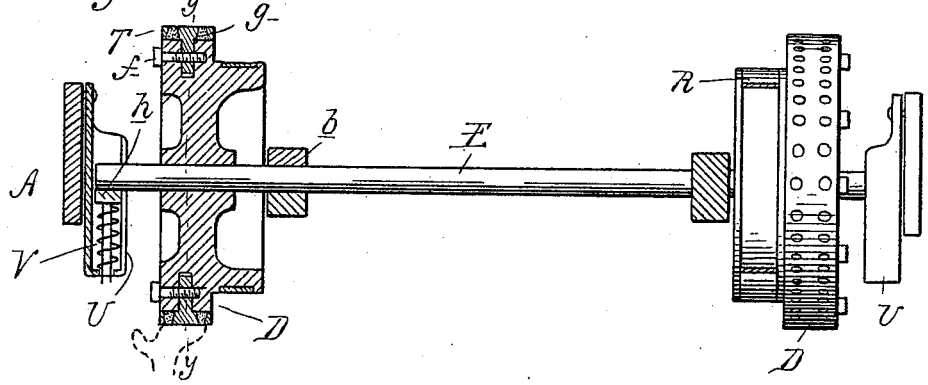
Figure 4:
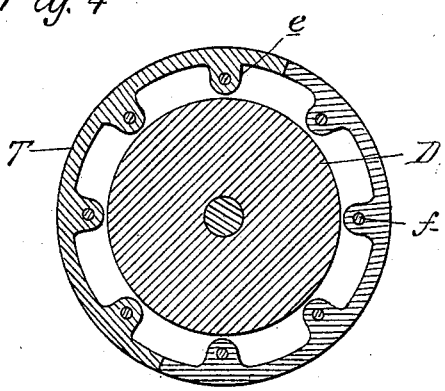
Figure 5:
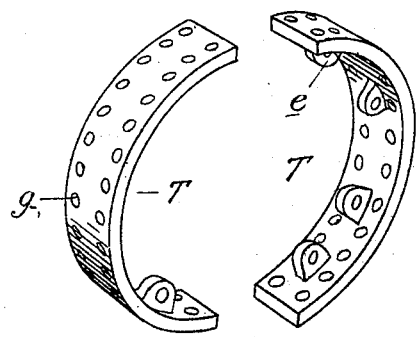

In the drawings, Figure 1 is a bottom plan view of a car-truck to which my brake is applied. Fig. 2 is a vertical longitudinal section thereof. Fig. 3 is a cross-section on lines $x$ $x$ of Fig. 1. Fig. 4 is a section on lines $y$ $y$ of Fig. 3. Fig. 5 is a detached perspective view of the braking-flanges, and Fig. 6 is a perspective of a portion of the brake mechanism.

A is the frame of the truck, in which are journaled the supporting-axles B and B', provided with the wheels C. Between these axles are arranged the wheels D, preferably secured to the common axle E and journaled in the hinged frame F, by means of which the wheels may be lowered to the track. The frame F consists of the side bars $a$, pivotally secured at one end to the cross-bars G of the truck-frame, said bars being provided with bearings $b$, in which the axle E is journaled, and the arms $c$, extending beyond the bearings.

H is a shaft extending across the frame in proximity to the arm $c$ and provided with cams I, bearing against said arms.

J is a segment-arm secured to the shaft H.

K is a wheel or drum secured to one of the axles of the truck.

L is a flexible strap or band passing around the periphery of the wheel K, one end being connected to the segment-arm J and the other end to the rock-arm M, pivotally secured upon the axle B.

N is an actuating-arm for the rock-arm M, which is connected by a chain or other connection O to the brake-shaft P. Secured upon the axle E and preferably integrally formed with the wheel D are the brake-drums Q. R are flexible bands passing around these brake-drums, one end of each being secured to the hinged frame F and the other end being connected to a stationary point on the truck-frame, preferably formed by the arm S, clamped upon the cross-bars G. Suitable means are provided for adjusting the tension of the strap, such as the screw $d$ engaging with a screw-threaded aperture in the arm S and having a swivel connection with the strap R.

Upon the periphery of the wheels D are secured the friction-rims T, preferably by forming a peripheral groove in the wheels D, into which lugs $e$ on the rims T engage and are secured by clamping-bolts $f$. The rims T are provided with tapering apertures $g$, which are smallest at the outer face and in which are secured plugs formed of some hard substance, such as emery or corundum. The ends of the axle E are journaled in bearings $h$, slidingly secured in slotted guides U and resting upon springs V, secured in said guides, the guides being preferably pivotally secured to the sides of the truck-frame.

The parts being thus constructed and arranged the operation of the brake is as follows: By means of the brake-staff P and connection O the rock-arm M is turned sufficiently to draw the strap L into frictional contact with the periphery of the drum K, which is turning in the direction to pull the strap L and segment-arm J. This will turn the shaft H and the cams I thereon, which will bear down upon the extension $c$ of the hinged frame, carrying the frame downward and pressing the wheels D into contact with the track. At the same time that the wheels D are moving downward a tension is placed on the strap R, as one end of said strap is secured to a stationary arm S and the other to the movable frame. This will cause sufficient friction on the drum Q to greatly retard the turning of the wheels D, and as the latter are pressed so firmly into contact with the track as to sustain the greater portion of the load of the car the latter will quickly be brought to a standstill. It will be observed that the power required to operate the brake is only that required to hold the strap L in frictional contact with the drum K, the power required for operating the main brake being furnished by the motion of the car. The brake-drum K thus forms an operating device for the main brake, but it also acts as a brake in itself, tending to retard the motion of the axle on which it is secured, not, however, with sufficient force to bring the wheels to a standstill before the car is stopped. Upon releasing the tension on the brake-strap L the latter will lose its frictional contact with the drum K, allowing the wheels D to again be withdrawn from the track by the tension of the springs V. Thus it will be seen that a powerful braking effect may be applied without any danger of injuring the wheels of the car.

What I claim as my invention is—

1. The combination with a main braking device independent of the supporting-wheels of the truck and comprising a wheel and a retarding device therefor, of a second brake on one of the truck-supporting axles under control of the brakeman and adapted in its operation to furnish the power for operating the main braking device.

2. The combination with the main brake independent of the supporting-wheels of the truck, of a second brake comprising a brake-wheel on one of the truck-supporting axles, a brake-strap passing around a segment of the periphery of said wheel and connecting at one end with the operating mechanism of the main brake, a rock-arm pivoted on the axle and connected with the other end of said strap, and means for locking said rock-arm to apply the brake.

3. The combination with a movable arm or frame hinged to the truck-frame and a wheel journaled therein adapted to be pressed thereby into contact with the track, of a retarding device for said wheel comprising a drum secured to the wheel and a strap passing around said drum having one end secured to said hinged arm or frame and the other end to an eccentric stationary point of attachment.

4. A brake comprising the frame F hinged to the frame of the truck, the wheels D on the axle E journaled in said frame, provided with a retarding device, such as the drums Q and straps R, the guides U for the end of the axle E, the supporting-springs V therein, the rock-shaft H having the cams I for depressing the hinged frame, the arm J on said rock-shaft, the drum K on the axle B, the strap L connected at one end to the arm J and passing over the drum K, the rock-arm M pivoted on the axle to which the end of said strap is secured, the actuating rock-arm N therefor, and a connection between said actuating-arm and the brake-staff.

5. A brake-wheel comprising a body and a rim surrounding said body formed of segments detachably secured thereto by lugs and clamping-bolts, said segments having the apertures $g$ formed therethrough, tapering toward the outer surface, and wearing-blocks of corresponding form fitting in said apertures, substantially as described.

6. The combination with a wheel track-brake and retarding means therefor, of a second brake on one of the truck-supporting axles, means for operating said second brake, and mechanism whereby the track-brake is operated upon the operation of said second brake.

7. The combination with a rotating brake independent of the supporting wheels and axles of the truck, of a retarding device therefor, and means under the control of the brakeman for operating said retarding device, said means adapted to be actuated by the rotation of the truck-wheels.

In testimony whereof I affix my signature in presence of two witnesses.

ROBERT RICE.

Witnesses:
M. B. O'DOGHERTY,
OTTO F. BARTHEL.